United States Patent [19]

Sakamoto

[11] 4,270,141
[45] May 26, 1981

[54] METHOD AND MACHINE FOR REPRODUCING A COLOR PICTURE BY STORING SIGNAL STREAMS, ONE ENTIRELY, AND THE REST PARTIALLY

[75] Inventor: Takashi Sakamoto, Kyoto, Japan

[73] Assignee: Dainippon Screen Seizo Kabushiki Kaisha, Kyoto, Japan

[21] Appl. No.: 59,739

[22] Filed: Jul. 23, 1979

[30] Foreign Application Priority Data

Aug. 4, 1978 [JP] Japan .................. 53-94507

[51] Int. Cl.³ ............................ H04N 1/46
[52] U.S. Cl. .................................. 358/78
[58] Field of Search ............... 358/75, 78, 80

[56] References Cited

U.S. PATENT DOCUMENTS 4,060,829  11/1977  Sakamoto ............... 358/78 X

*Primary Examiner*—Robert L. Richardson

*Attorney, Agent, or Firm*—Daniel M. Rosen

[57] ABSTRACT

A method and machine for reproducing a picture are disclosed, in which a color original picture is scanned and the analog original picture signal thereby produced is broken into n separation picture signals, which are then digitalized. One of these separation picture signals is then stored in its entirety in a memory, while the others are sampled according to regular patterns, the sampled values being stored in the memory. Then digital output separation picture signals are read out of the memory, by reading out the first separation picture signal without alteration, and by reading out the others while interpolating between the stored values. The output signals are then used to record a reproduction picture. In embodiments, the entirely-stored picture signal can be a gray signal, while the sampled picture signals are color signals; or the entirely-stored picture signal can be a green signal, while the sampled picture signals are red and blue color signals.

16 Claims, 16 Drawing Figures

FIG. 5

| | 0 | 1 | 2 | 3 | ... | N |
|---|---|---|---|---|---|---|
| 0 | R00 | / | / | R03 | / / R06 / | Ron |
| | / | / | / | / | / / / / | / |
| | / | / | / | / | / / / / | / |
| 1 | R30 | / | / | R33 | / / R36 / | R3n |
| | / | / | / | / | / / / / | / |
| | / | / | / | / | / / / / | / |
| 2 | R60 | / | / | R63 | / / R66 / | R6n |
| | / | / | / | / | / / / / | / |
| M | Rm0 | / | / | Rm3 | / / Rm6 / | Rmn |

| | 0 | 1 | 2 | 3 | 4 | 5 | 6 | ... | n |
|---|---|---|---|---|---|---|---|---|---|
| 0 | W00 | W10 | W20 | W30 | W40 | W50 | W60 | | W0n |
| 1 | W01 | W11 | W21 | W31 | W41 | W51 | W61 | | W1n |
| 2 | W02 | W12 | W22 | W32 | W42 | W52 | W62 | | W2n |
| 3 | W03 | W13 | W23 | W33 | W43 | W53 | W63 | | W3n |
| 4 | W04 | W14 | W24 | W34 | W44 | W54 | W64 | | W4n |
| 5 | W05 | W15 | W25 | W35 | W45 | W55 | W65 | | W5n |
| 6 | W06 | W16 | W26 | W36 | W46 | W56 | W66 | | W6n |
| 7 | W07 | W17 | W27 | W37 | W47 | W57 | W67 | | |
| m | Wm0 | Wm1 | Wm2 | Wm3 | Wm4 | Wm5 | Wm6 | Wm7 | Wmn |

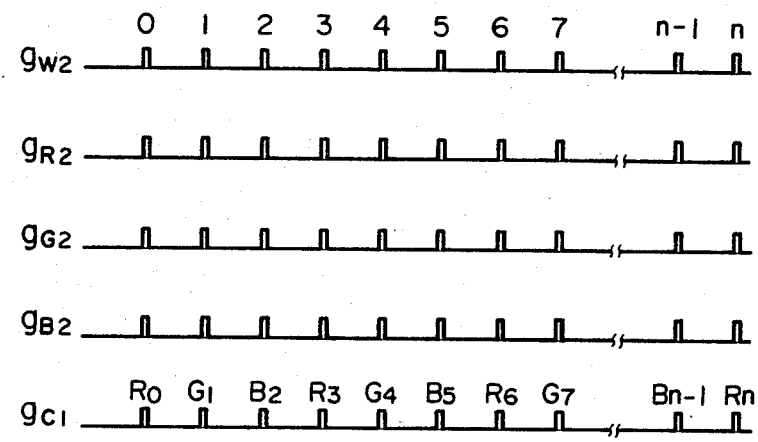

METHOD AND MACHINE FOR REPRODUCING A COLOR PICTURE BY STORING SIGNAL STREAMS, ONE ENTIRELY, AND THE REST PARTIALLY

BACKGROUND OF THE INVENTION

The present invention relates to a method and a machine for reproducing a reproduction picture from an original picture by scanning, and, more particularly, relates to a method and a machine for reproducing a reproduction picture from an original picture by scanning, in which a light spot scans the original picture, and from this light spot is produced an analog original picture signal, and this analog original picture signal is broken down into a plurality of separation picture signals which, after digitalization, are stored in a memory. Then from the memory are read out digital reproduction picture signals, which are converted into analog signals and either are used to record a plurality of reproduction pictures, or are combined so as to record a combined reproduction picture. In such a system, the present invention offers a way in which the capacity required for the memory can be reduced.

It has been practiced heretofore to carry out such a method by a layout scanner. A plurality of color original pictures are scanned to produce an original picture analog signal, and this signal is then separated into, for example, red, green, and blue color separation analog signals. Then these color separation analog signals are converted into color separation digital signals in an analog/digital converter. The digitalized color separation signals are stored in a memory. Then, depending upon the desired layout positions, digital color separation picture reproduction signals are read out of the memory, and then these are converted into analog color separation reproduction signals of yellow, magenta, cyan, and black colors in a digital/analog converter. These signals are then used to modulate a recording light beam, and thereby color separation pictures are obtained as laid out in the desired positions on a recording film.

However, such a method involves a memory which has a large capacity. For instance, if an original color picture with a size of 250 ×250 mm is scanned at a scanning density of 20 lines per mm, altogether there are obtained $(20 \times 250)^2 = 25$ million picture elements. If therefore the picture signals are broken down into red, green, and blue signals, there are required three times as many storage locations in the memory, i.e. 75 million, and if the picture signals are broken down into yellow, magenta, cyan and black signals, there are required four times as many storage locations in the memory, i.e. a hundred million. Thus, if the number of levels for each color signal is set to 256, so that each color signal stored in the memory requires one byte, or eight bits, then a memory with a capacity of 75 or 100 megabytes is required. If, further, several original pictures are scanned in a single scanning operation, and the picture signals for them all are stored together in the memory, then the size required for the memory further increases. This is what is required in a layout scanner: it is necessary to store picture signals for each separation color for the entire area of each original picture. Further, the memory has to be capable of responding at a high speed, and has to be random-access. Therefore the cost becomes high, and the size of the total picture area which can be handled is limited.

SUMMARY OF THE INVENTION

The present invention is based upon the fact that, although a human being can detect delicate variations of brightness across boundaries in a picture, he cannot detect variations of color value nearly so finely. That is, even if the degree of fineness of the color graduations is set much less finely than that of the brightness graduations, for instance, one-third as fine, the quality of the reproduction picture will not suffer unduly, and no practical inconvenience will be caused.

Therefore, it is an object of the present invention to provide a method for recording color reproduction pictures from original pictures, which is free from the abovementioned defects, which requires a memory of substantially less capacity, and which produces a produces a reproduction of substantially unaltered quality.

Further, it is an object of the present invention to provide an apparatus for recording color reproduction pictures from original pictures, which is free from the abovementioned defects, which comprises a memory of substantially reduced capacity, and which produces a reproduction of substantially unaltered quality.

According to the present invention, this first object is accomplished by a method for reproducing a picture, wherein a color original is scanned by a light spot to generate an analog original picture signal; the analog original picture signal is separated into a plurality of n analog separation original picture signals; each of the n analog separation original picture signals is converted into a stream of digital separation original picture signals; one of these digital separation original picture signal streams is stored in its entirety in a memory, and each of the (n−1) other digital separation original picture signal streams is sampled according to a regular pattern and the sampled digital separation original picture signals are stored in the memory; and wherein digital separation reproduction picture signal streams are produced, corresponding to the digital separation original picture signal streams, by, in the case of the said one digital separation original picture signal stream, reading out its stored values from the memory, and, in the case of each of the (n−1) other digital separation original picture signal streams, reading out the stored sampled digital separation original picture signals corresponding thereto from the memory, while interpolating intermediate values therebetween; these digital separation reproduction picture signal streams then being converted to analog form and used to produce a reproduction picture.

Further, according to the present invention, this further object is accomplished by a machine for reproducing a color picture, comprising a pickup head which scans a color original picture by a light spot and generates an analog original picture signal; a color separator, which separates the analog original picture signal into n analog separation original picture signals; an analog-digital converter, which converts each of the n analog separation original picture signals into a stream of digital separation original picture signals; a signal skip means, which samples (n−1) of the n streams of digital separation orginal picture signals, each according to a regular pattern; a memory, in which are stored the sampled values of these (n−1) digital separation original picture signal streams, and in which also is stored in its entirety the other digital separation original picture signal stream; an addressing means, which provides addresses to read out stored values from the memory to provide memory output signal streams to correspond to the n digital separation original picture signal streams; a signal interpolation means which interpolates values into the (n−1) memory output signal streams which correspond to the (n−1) digital separation original picture signal streams which were sampled, and which does not alter the other memory output signal stream, and which outputs these streams as digital separation reproduction picture signal streams; a digital-analog converter, which converts the digital separation reproduction picture signal streams into analog separation reproduction picture signal streams; and a recording head, which receives the analog separation reproduction picture signal streams and which records a reproduction picture therefrom.

BRIEF DESCRIPTION OF THE DRAWINGS

The present invention will become more clear from the following description of several embodiments thereof, and from the accompanying drawings. It should be understood, however, that these descriptions and drawings are given for the purposes of explanation only, and are not intended to limit the scope of the present invention, which is to be delimited solely by the appended claims. In the drawings:

FIG. 5 is a memory map of gray and red color digital signals stored in a memory by addressing, in the machine of FIG. 1;

FIG. 7 is a time chart of digital signals sampled according to the method of the present invention;

FIG. 8 is a memory map of color digital signals stored in a memory by addressing, in the machine of FIG. 6;

FIG. 14 is a schematic view of four adjacent interpolation units, interpolated over according to a conventional interpolation method; FIG. 15 is a similar view of four interpolation units, interpolated over according to an embodiment of the present invention; and FIG. 16 is a schematic view of a digital circuit for obtaining read-out addresses for picture signals.

DESCRIPTION OF THE PREFERRED EMBODIMENTS

Figure 1:
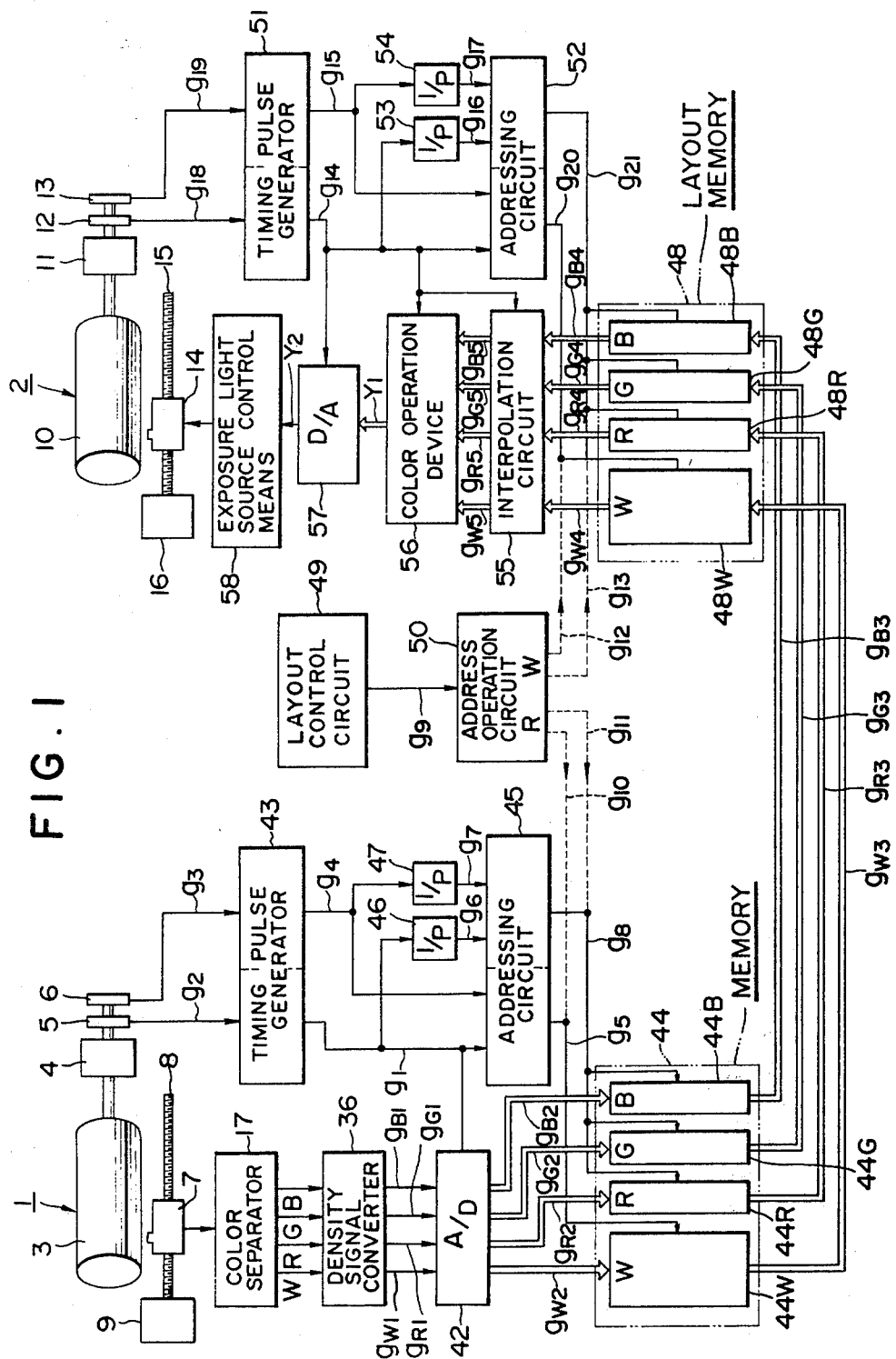
FIG. 1 is a block diagram of a first layout scanner which practices an embodiment of the present invention.

In FIG. 1 is shown an embodiment of a layout scanner which practices the present invention. The basic construction is the same as that of a known color scanner which records a reproduction picture with variable reproduction scale. This machine comprises an original picture scanning machine 1 and a recording picture scanning machine 2, which can be operated independently.

The original picture scanning machine 1 comprises an original picture cylinder 3 which is rotated about its axis by a motor 4, pivot angle encoder 5 which detects the angle of turning of the original picture cylinder 3, a one-cycle encoder 6 which detects each rotation of the original picture cylinder 3, a pickup head 7 which picks up picture signals by scanning the original picture, mounted on the original picture cylinder 3, by a light spot, a feed screw 8 which moves the pickup head 7 axially along the original picture cylinder 3, and a feed motor 9 which drives the feed screw 8.

The recording picture scanning machine 2 has a similar construction to the original picture scanning machine 1, and comprises a recording cylinder 10, a motor 11 which drives the recording cylinder 10 and a pivot angle encoder 12 which detects the angle of turning thereof, a one-cycle encoder 13 driven by the motor 11 which detects each rotation of the recording cylinder 10, a recording head 14 which records a reproduction picture onto a recording film which is attached on the recording cylinder 10, a feed screw 18 which moves the recording head 14 along the axis of the recording cylinder 10, and a feed motor 16 for driving the feed screw 15.

The motors 4, 9, 11 and 16 which drive the original picture cylinder 3, the pick-up head 7, the recording cylinder 10, and the recording head 14, respectively, are controlled in a way which is per se well known by feedback signals which are generated by the pivot angle encoders 5 and 12 and the one-cycle encoders 6 and 13, so as to maintain synchronization between the original picture cylinder and the recording cylinder, and to ensure properly controlled uniform scanning.

The pickup head 7 is provided with a color separator 17 which separates the picture signal obtained by scanning the original picture into a plurality of color separation picture signals. In this case, the original picture signal (which is an analog signal) is separated into a red color separation brightness signal R, a green color separation brightness signal G, and a blue color separation brightness signal B. A gray color brightness signal W is also formed from the picture signal.

Figure 2:
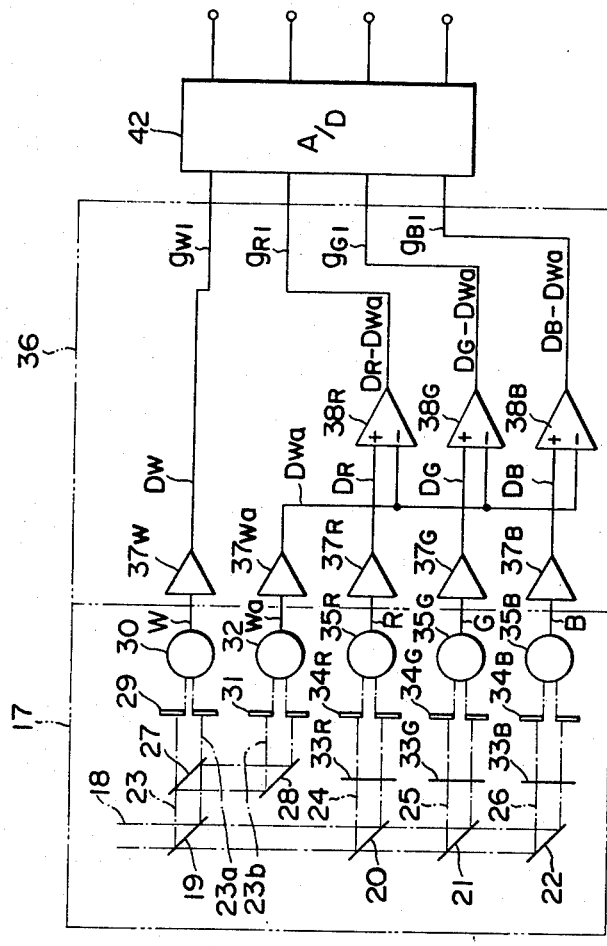
FIG. 2 is a block diagram of a color separator and a density signal converter device in the machine of FIG. 1.

In FIG. 2 is shown the construction, in this embodiment, of the color separator 17, and of a density signal converter 36 which is provided in the pickup head 7.

A light beam 18 coming from the original picture through a proper optical system which is not shown is separated into four light beams 23, 24, 25, and 26 by three half mirrors 19, 20, and 21, and a mirror 22. The light beam 23 first divided off is further separated into two beams 23a and 23b by a half mirror 27 and a mirror 28.

Figure 4:
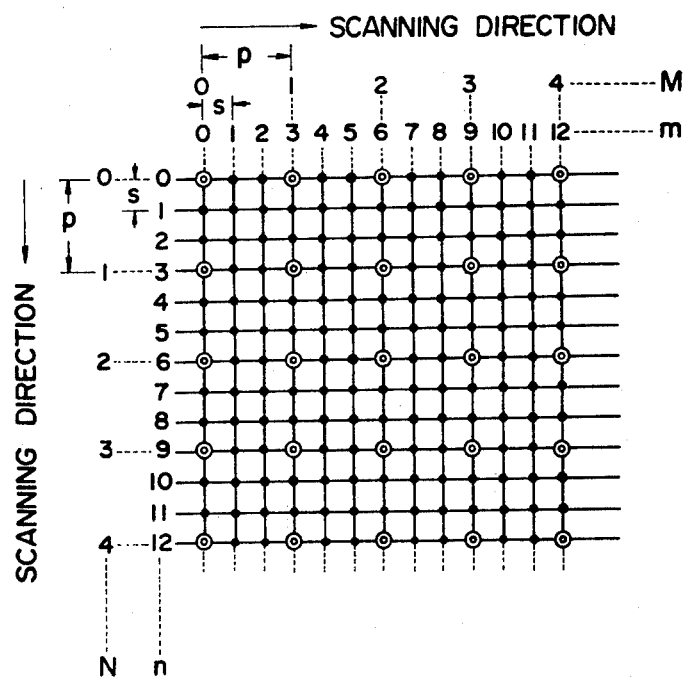
FIG. 4 is a schematic view of the arrangement of digital picture signals stored in a memory, according to an embodiment of the present invention, in which small black dots represent gray picture elements, and circles represent red, green, and blue color picture elements.

The light beam 23a is incident to a photoelectric converter element 32 via an aperture 31 having an effective diameter which is the same as the scanning pitch s hereinafter referred to with reference to FIG. 4. Then the photoelectric converter element 30 outputs the gray color brightness signal W which is sharp.

The light beam 23b is incident upon a photoelectric converter element 32 via an aperture 31 having an effective diameter which is several times as large as the aperture 29. Thus the photoelectric converter element 32 outputs the gray color brightness signal Wa which is somewhat less sharp than the gray color brightness signal W, from the point of view of scanning the detail of the original picture, as is well known in the art.

Thus the gray color brightness signals W and Wa correspond to sharp and unsharp signals for contrasting details of the reproduction picture.

The light beams 24, 25, and 26 are passed through color separation filters, 33R, 33G, and 33B for red, green, and blue colors, and then are incident to photoelectric converter elements 35R, 35G, and 35B, via apertures 34R, 34G, and 34B. These photoelectric converter elements 35R, 35G, and 35B output the red, green, and blue color brightness signals R, G, and B.

The effective diameters of the apertures 34R, 34G, and 34B are the same or a little smaller than the aperture 31 of the gray color brightness signal Wa, in order for the sharpnesses of the four signals to be of the same order, since the sharpness of each color separation brightness signal R, G, or B depends on the effective diameter of the aperture.

Then the brightness signals W, Wa, R, G, and B are sent to a density signal converter 36, which comprises logarithmic converters 37W, 37Wa, 37R, 37G, and 37B, and differential amplifiers 38R, 38G, and 38B.

The brightness signals W, Wa, R, G, and B are sent to the logarithmic converters 37W, 37Wa, 37R, 37G, and 37B, and are converted therein into density signals Dw, DWa, DR, DG, and DB. The red, green, and blue density signals DR, DG, and DB are fed to the differential amplifiers 38R, 38G, and 38B, and the gray density signal DWa of a low sharpness is also fed to these differential amplifiers. The differential amplifiers then carry out the calculations DR-DWa, DG-DWA, and DB-DWA, respectively, to obtain color signals gR1, gG1, and gB1, respectively.

Figure 3:
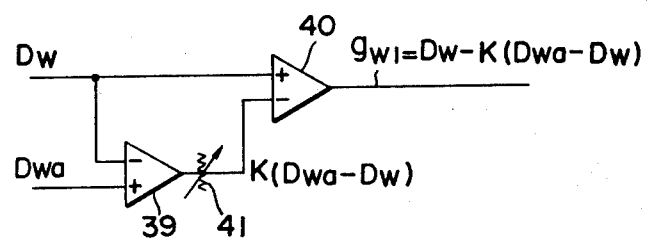
FIG. 3 is a schematic view of a detail contrasting circuit used in the machine of FIG. 1.

The gray density signal DW of a high sharpness may be directly used as a gray signal gW1 as it is, to obtain a fairly sharp reproduction picture. However, the details of the gray density signal DW are preferably contrasted by a conventional detail contrast circuit shown in FIG. 3.

The gray density signal DW of a high sharpness, and the gray density signal DWa of a low sharpness are sent to a differential amplifier 39, which performs the calculation K(DWA-DW) and outputs the result. The sharp gray density signal DW and the output signal K(DWa-DW) are fed to another differential amplifier 40, which outputs a gray signal gW1 which equals DW-K(DWaDW), in which the details are contrasted, wherein K is the amplification rate of the amplifier 39, which is set to the desired value by a potentiometer 41. The contrasting rate of the details depends on the amplification rate K.

Referring again now to FIG. 2, the gray, red, green, and blue analog signals gW1, gR1, gG1, and gB1 are input to an analog-digital converter 42, hereinafter referred to as an A/D converter, and are converted into gray, red, green, and blue digital signals gW2, gR2, gG2, and gB2, in synchronization with a high-speed timing pulse g1 generated by a timing pulse generator 43, such as a phase synchronization control circuit. This timing pulse generator 43 also outputs a low speed timing pulse g4, which has the same degree of accuracy as the high speed timing pulse g1, in synchronization with a timing pulse g3 output from the one-cycle encoder 6, per one rotation of the original picture cylinder.

The digital signals gW2, gR2, gG2, and gN2 are next stored in respective units 44W, 44R, 44G, and 44B of a memory 44, by addressing in a fashion which is the essence of the present invention, and which will now be explained.

An addressing circuit 45 generates the addresses for the addressing. From the high speed timing pulse g1 and the low speed timing pulse g4 an address g5 is calculated, locating the stored value by these as coordinates in a matrix in a per se well known way. This address is used for storing the gray signal gW2. Therefore, as may be seen in FIG. 4, which is a symbolical illustration of stored signals in the memory, a representation of the gray picture is built up in the memory 44W, at a density which depends upon the frequency of the high speed timing pulses g1, shown as "s" in the vertical direction, which represents the scanning direction along the cylinder's circumference. In the present embodiment, it is so arranged that the distance that this frequency corresponds to is the same as the distance s between the scanning lines, which appears in FIG. 4 as "s" in the horizontal direction. Thus the stored values in the gray memory 44W represent the gray values in the original picture, at an array whose mesh in both the vertical and the horizontal directions is s. Therefore this memory has to be quite large, in order to store values for the gray signal for the whole picture at this rather fine mesh size.

However, the addressing performed by the address signal circuit 45 for the red, green, and blue signals is different, and it is here that economy of storage arises. As may be seen in FIG. 1, counters 46 and 47 are provided which count every p-th one of the high speed pulses g1 and the low speed pulses g4, and produce output pulses g6 and g7. In the present embodiment, therefore, it may be seen that this counting rate is the same for the high speed and the low speed pulses. However, this is not essential. The color digital signals gR2, gG2, and gB2 are sampled and stored in addresses g8 produced by and in synchronization with these pulse trains g6 and g7. In the present embodiment, of course, p=3. Thus, considering the red signals as an example, for each p lines the same pattern recurs: that is, the first line is sampled at a pitch of p, and thus 1/p of the red signals are stored; then the next p−1 lines are skipped completely. The cycle then repeats, and thus it is seen that out of every $p^2$ color signals $p^2-1$ are skipped, in a certain pattern, and 1 is stored. This is diagrammatically shown by the small circles in FIG. 4, which correspond to the stored color values, for each color.

Thus, to generalize, the important thing is that the gray signals are stored in their entirety, and, according to a repetitive pattern, which may be any of a wide range, in various embodiments, each of the color signals is sampled, and the sampled values are stored. Thereby, as may be seen from the present embodiment, the memory space required for these color signals is greatly reduced. In the shown embodiment, wherein of every nine color signals only one is stored ($p^2$, where $p=3$), therefore, each color memory may be only one ninth (i.e., $1/p^2$) of the size that it would have to be if the color signals had to be entirely stored.

Of course, it is not necessary, from the point of view of the present invention, that the signal which is stored in its entirety should be a gray signal, or that the other signals should be red, green, and blue color separation signals. Other combinations could be envisaged. Nor is it essential that the repetitive pattern should be the square one shown here: a rectangular one could be used, or some other; or indeed the present invention is applicable to other sorts of scanning, different from rectangular line-by-line scanning. For instance, the present invention is applicable to polar or circular scanning.

A layout memory 48 for changing the layout positions of the pictures, i.e., the address numbers of the picture element signals, has the same capacity and construction as the memory 44, and comprises a gray signal memory unit 48W, and red, green, and blue color signal memory units 48R, 48G, and 48B.

A layout control circuit 49 and an address operation circuit 50 are associated with the memories 44 and 48 when the address numbers of the digital signals stored in the memory 44 are changed while the digital signals stored in the memory 44 are transferred to the memory 48.

The layout control circuit 49 outputs an address change signal g9 for changing the addresses of the digital signals stored in the memory 44 to the address operation circuit 50. This address operation circuit 50 outputs simultaneously reading address signals g10 and g11 for reading out the digital signals stored in the gray signal memory unit 44W and the color signal memory units 44R, 44G, and 44B, and writing address signals g12 and g13 for writing the digital signals having the address numbers changed into the gray signal memory unit 48W and the color signal memory units 48R, 48G, and 48B of the layout memory 48, in synchronization with the address change signal g9.

The gray, red, green, and blue digital signals stored are read out of the memory 44 by addressing in synchronization with the reading address signals g10 and g11 and simultaneously they are written into the layout memory 48 by addressing in synchronization with the writing address signals g12 and g13, while the addresses are changed according to the address change signal g9 output from the layout control circuit 49.

A timing pulse generator 51, an addressing circuit 52, and p-counter circuits 53 and 54 have the same constructions and functions as the timing pulse generator 43, the addressing circuit 45, and the p-counters 46 and 47 described above. Thus, high speed and low speed timing pulses g14 and g15 output from the timing pulse generator 51, timing pulses g18 and g19 generated from the pivot angle encoder 12 and the one-cycle encoder 13, timing pulses g16 and g17 output from the p-counters 53 and 54, and address signals g20 and g21 output from the addressing circuit 52 are obtained in the same manner as described above, and therefore have the same functions as the pulses and signals g1, g4, g2, g3, g6, g7, g5, and g8 described above, respectively. Hence, in the interest of brevity, detailed description thereof is omitted.

Thus, the digital signals gW3, gR3, gG3, and gB3, stored in the layout memory 48, are read out by addressing in synchronization with the address signals g20 and g21 generated by the addressing circuit 52. The gray, red, green, and blue digital signals gW4, gR4, gG4, and gB4 output from the layout memory 48 are input to an interpolation circuit 55 in which the color digital signals which were skipped when the color digital signals were stored in the memory 44 are reintroduced, according to the adjacent signals thereto, by interpolating, as hereinafter described.

Of course, the gray digital signals gW4 are not changed in the interpolation circuit 55, which outputs them just as they are.

The gray, red, green, and blue digital signals gW5, gR5, gG5, and gB5 output from the interpolation circuit 55 are fed to a color operation device 56, and are converted from the additive primaries of R,G,B to the subtractive primaries of Y,M,C, and a black signal K.

This color operating device 56, including a color correction circuit and so forth, outputs color separation reproduction signals K1, Y1, M1, and C1. In this case, as shown in FIG. 1, the yellow color separation reproduction signal Y1 is shown. The color separation reproduction signals K1, Y1, M1, and C1 are input to a D/A converter 57, and are converted therein into analog separation reproduction signals K2, Y2, M2, and C2. The yellow color separation reproduction signal Y2 is shown in FIG. 1. The interpolation circuit 55, the color operation device 56, and the D/A converter 57 are operated in synchronization with the high speed timing pulse g14.

These analog separation reproduction signals K2, Y2, M2, and C2 are fed to an exposure light source control means 58, which controls the recording head 14 and thereby obtains black, yellow, magenta, and cyan reproduction pictures on the recording film attached on the recording cylinder 10 in a per se well known way.

Figure 6:
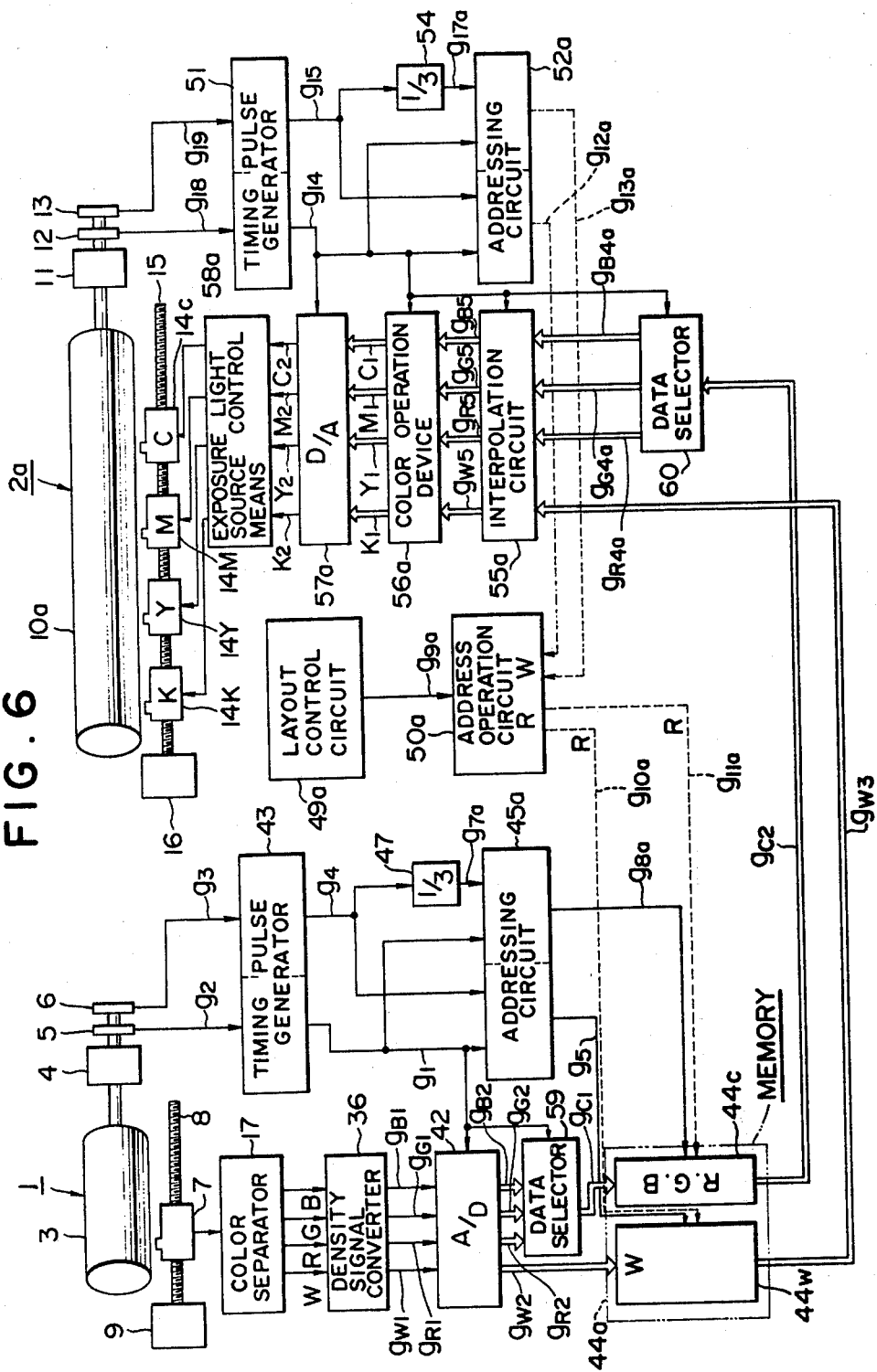
FIG. 6 is a block diagram of another layout scanner which practices an embodiment of the present invention.

FIG. 6 shows another embodiment of a layout scanner according to the present invention. Before entering into the detailed description of this embodiment, it should be noted that the same reference numbers as those in FIG. 1 denote similar members, and detailed description thereof will be sometimes omitted for the sake of brevity.

This layout scanner comprises an original picture scanning machine 1 which has the same construction as that described above, and a recording scanning machine 2, which is similar to that described above, except that it has a long recording cylinder 10a and four recording heads 14K, 14Y, 14M, and 14C for black, yellow, magenta, and cyan respectively.

The picture signals picked up by scanning the original pictures on the original picture cylinder 3 are converted into the gray, red, green, and blue digital signals gW2, gR2, gG2, and gB2 via the color separator 17, the density signal converter 36 and the A/D converter 42, in the same manner as in the embodiment in FIG. 1.

The gray digital signals gW2 output from the A/D converter 42 are stored in their entirety in the gray signal memory unit 44W of a memory 44a in the same manner as described above, and thus the memory map thereof is the same as the one shown in FIG. 5.

The color digital signals gR2, gG2, and gB2 are sent to a first data selector 59 in which each is sampled every three times, and these values are arranged in interleaved fashion, in synchronization with the high speed timing pulse g1, as shown in FIG. 7. Thus the data selector 59 outputs these mixed color signals gc1 to a color signal memory unit 44c. From the mixed color signals gc1, ⅔ of the signals of each color have been dropped.

These mixed color digital signals gc1 are stored in the color signal memory unit 44c of the memory 44a in synchronization with an address signal g8a which is output from an addressing circuit 45a, by addressing the longitudinal or vertical address n in FIG. 8 according to the high speed timing pulse g1 which is fed to the addressing circuit 45a, and by addressing the transverse or horizontal address M in FIG. 8 according to a timing pulse g7a which is prepared by dividing the pulse rate of the low-speed timing pulse g4 by three in a 3-counter 47.

The memory map of the mixed color digital signals gc1 is shown in FIG. 8. The address space of the color signal memory unit 44c is clearly ⅓ that of the gray signal memory unit 44W, and is the same as the total capacity of the color signal memory units 44R, 44G, and 44B in FIG. 1.

This layout scanner is provided with no layout memory such as the one in FIG. 1. A layout control circuit 49a outputs an address change signal g9a for changing the addresses of the digital signals to be read out of the memory 44a to an address operation circuit 50a.

An addressing circuit 52a outputs address signals g12a and g13a which address the positions of the reproduction picture to the address operation circuit 50a. The address operation circuit 50a outputs addressing signals g10a and g11a for addressing the digital signals to be read out, of which addresses are changed according to the address change signal g9a which is output from the layout control circuit 49a, to the memory 44a.

The gray digital signals gW2 and the mixed color digital signals stored, gc2, are read out of the memory 44a in synchronization with the address signals g10a and g11a, thereby outputting gray and mixed color digital signals gW3 and gc2 having the new addresses as changed.

These gray digital signals gW3 are sent to an interpolation circuit 55a. The mixed color digital signals gc2 are sent to a second data selector 60, and are separated into three red, green, and blue color separation digital signals gR4a, gG4a, and gB4a, in synchronization with the high speed timing pulse g14.

These color separation digital signals gR4a, gG4a, and gB4a are input to the interpolation circuit 55a. The interpolation circuit 55a reproduces the color digital signals which were skipped when the color digital signals were sent to the first data selector 59, and their levels, according to the adjacent color digital signals thereto, as hereinafter explained. The gray digital signals are not altered in the interpolation circuit 55a, which outputs them just as they are.

The gray, red, green, and blue digital signals gW5, gR5, gG5, and gB5 output from the interpolation circuit 55a are fed to a color operation device 56a, and are converted there from the additive primaries or light primaries R,G,B to the subtractive primaries or ink primaries Y,M,C.

The color operation device 56a, which includes a color correction circuit and so forth, outputs color separation reproduction signals K1, Y1, M1 and C1 to a digital-analog converter 57a. These signals are therein converted into analog separation reproduction signals K2, Y2, M2, and C2. These analog separation reproduction signals are then sent to an exposure light source control means 58a, which controls the recording heads 14k, 14y, 14m, and 14c, thereby obtaining simultaneously black, yellow, magenta, and cyan reproduction pictures on the recording film attached on the recording cylinder 10a.

In this second embodiment, the longitudinal address numbers n in FIG. 8 of the gray signal memory unit 44W and the mixed color signal memory unit 44c are the same, which is advantageous for the reading out of the stored signals.

Now a method for interpolating the color signals skipped in the interpolating circuit 55 or 55a will be described.

The color digital signals gR2, gG2, and gB2 or the mixed color digital signals gc2 stored in the memory units 44R, 44G, 44B, or 44c are read out by addressing two pairs of transverse and longitudinal addresses M and M+1 and N and N+1 at the same time, so as to output two pairs of picture element signals. Then the color signals which were skipped, between these picture element signals, are interpolated between these four picture element signals.

If the address numbers of the picture element signals in the color signal memory units are M and N, M and N+1, M+1 and N, and M+1 and N+1, then these signals correspond to signals in the gray signal memory unit with coordinates [3m, 3n], [3m, 3(n+1)], [3(m+1), 3n], and [3(m+1), 3(n+1)].

Regarding these four adjacent picture element signals as the four vertices of a square interpolation unit, the interpolated value at a point in the square interpolation unit will be found as follows.

Figure 9:
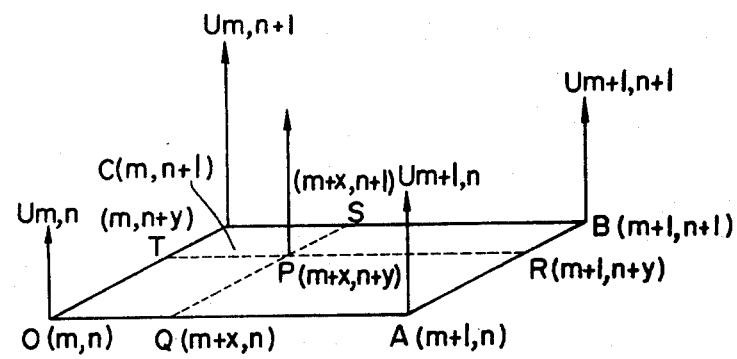
FIG. 9 is a schematic view in three dimensional coordinates of an interpolation unit for explaining a conventional interpolation method.

FIG. 9 shows a square interpolation unit OABC, where the interval to be interpolated over is taken as unity. According to a conventional interpolation method, for obtaining the interpolated value at a point P in this unit square, perpendiculars are drawn from the point P to the sides of the square, the feet of which are designated by Q, R, S, and T; and then the value at P is taken as the sum of the products of the values at the points O, A, B, and C, and the areas of the opposite rectangles. That is, value at P = value at O × area of PSBR + value at
A × area of PSCT + value at B × area of
OQPT + value at C × area of QARP That is, taking the function to be interpolated as U (x,y), $$U_{M+x,N+y} = U_{M,N}(1-x)(1-y) + U_{M+1,N}x(1-y) + U_{M,N+1}(1-x)y + U_{M+1,N+1}xy \ldots \quad (I)$$

Figure 10:
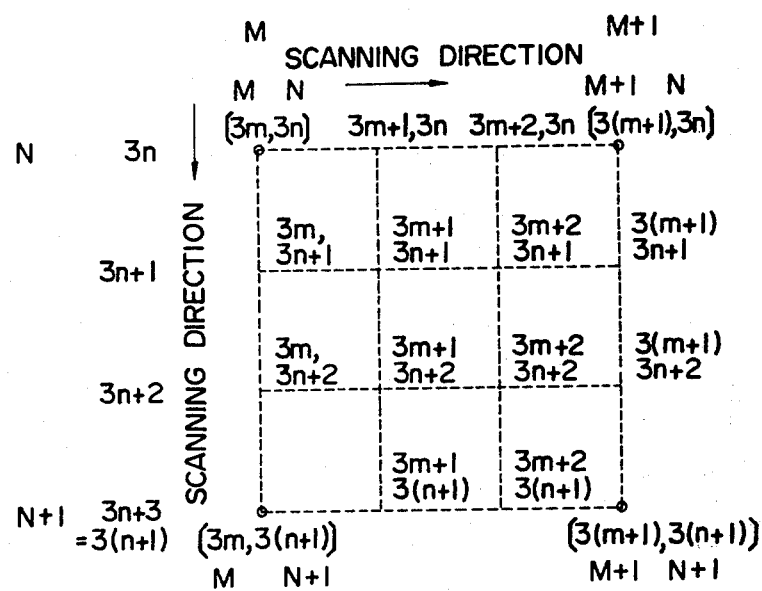
FIG. 10 is a schematic view in two dimensional coordinates of an interpolation unit for some embodiments of the present invention.

In FIG. 10 there is shown a square interpolation unit which includes nine picture element signals, i.e. three along each of the x and the y axes, having coordinates [3m,3n], [3m+1,3n], [3m+2,3n], [3m,3n+1], [3m+1,3n+1], [3m+2,3n+1], [3m,3n+2], [3m+1,3n+2], and [3m+2,3n+2], as shown in a manner similar to FIG. 5, in which the values of U at the four vertices are known.

Thus, according to the above described conventional method, the coefficients $(1-x)(1-y)$, $x(1-y)$, $(1-x)y$, and $xy$ of the terms of the formula (I) at the eight points to be interpolated at, which have the coordinates [3m+1,3n], [3m+2,3n], [3m,3n+1], [3m+1,3n+1], [3m+2,3n+1], [3m,3n+2], [3m+1,3n+2], and [3m+2,3n+2], are as shown in Table 1.

Figure 11:
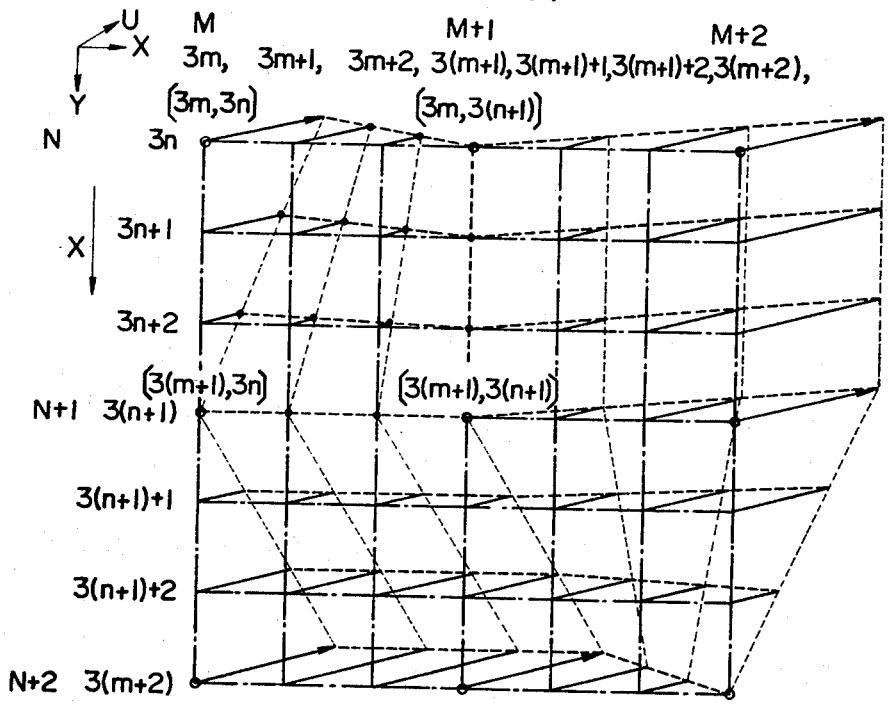
FIG. 11 is a schematic view in three dimensional coordinates of four adjacent interpolation units for interpolation of values, obtained according to a conventional interpolation method, in which the sampling pitch for the sampling is three.

FIG. 11 shows an example of the operation of this process of interpolation for four adjacent interpolation squares, according to the conventional process, using the formula (I). From this figure it is apparent that this method of interpolation provides smooth and continuous interpolated values. However, the number of terms for calculation, and the number of multiplications, and their nature, is rather high, and the calculations require a lot of time.

According to a particular feature of the present invention, the interpolation can be considerably simplified, without substantially reducing the quality of the reproduction picture, by simplifying the table of coefficients. This has a particular application in the present context of picture reproduction in which the gray values are entirely stored, while the color values are partially stored and later interpolated, because of the aforementioned tolerance of the human eye to greater gradations of color tone than of gray tone or brightness.

In the present example, referring to Table 1, the denominator, which was nine therein, is reduced to eight, and the odd numerators are reduced by one, while the even ones are left as they are. Then the fractions are reduced and rearranged, resulting in Table 2.

To generalize, since in general the unit square of interpolation is to be divided into p units according to the sampling pitch p, the denominator of the fraction which forms each coefficient is to be $p^2$.

In digital processing, it is most convenient for this denominator to be a power of 2, since then the division can be done by shifting. Therefore, according to the presently proposed interpolation method, a table is formed, similar to Table 1, for the particular value of p which is being used as the sampling pitch, and then the denominator of each of the fractions is adjusted from $p^2$ to the closest power of 2, and the numerators of each of the fractions are adjusted so as to be even, and so that all the fractions in any row sum to unity. Thereby each of the fractions can be cancelled, top and bottom, by at least two, resulting in a maximum denominator of $2^{n-1}$, where $2^n$ is the closest power of 2 to $p^2$. Thereby the table is considerably simplified. If further simplification is desired, this process can of course be repeated, reducing the maximum denominator to $2^{n-2}$.

Referring now again to Table 2, and to the case where p is three, the interpolated value is simply obtained by the following formula:

$$U_{3m+i,3n+j} = \tfrac{1}{4}[U_{3(m+X_1),3(n+Y_1)} + U_{3(m+X_2),3(n+Y_2)} + U_{3(m+X_3),3(n+Y_3)} + U_{3(m+X_4),3(n+Y_4)}] \quad (II)$$

wherein i and j are between zero and two inclusive, and each of the $X_k$ and $Y_k$ is zero or one. These $X_k$ and $Y_k$ are determined according to the combination of i and j, examples of which are tabulated in Tables 3 and 4, in which i and j, which may be 0, 1, or 2, are shown by binary-coded numbers 00,01, and 10.

It may be readily understood from Tables 3 and 4 that the $X_k$ and $Y_k$ may be determined when i and j are known. In Table 4, $X_3$ and $X_4$, and $Y_3$ and $Y_4$ are arranged so as to be the same values.

In order to obtain an interpolated value according to the formula (II), for example, when i is 1 and j is 2, i.e., the interpolation value $U_{3m+1,3n+2}$ at the coordinates [3m+1,3n+2], first one derives from Table 3 or 4 that $X_{1-4}=0,1,0,0$ and $Y_{1-4}=1,1,0,1$; or, alternatively, that $X_{1-4}=1,0,0,0$ and $Y_{1-4}=1,0,1,1$. Thus:

$$U_{3m+1,3n+2} = \tfrac{1}{4}[U_{3m,3(n+1)} + U_{3(m+1),3(n+1)} + U_{3m,3n} + U_{3m,3(n+1)}]$$

or $$= \tfrac{1}{4}[U_{3(m+1),3(n+1)} + U_{3m,3n} + U_{3m,3(n+1)} + U_{3m,3(n+1)}] = \tfrac{1}{4}[U_{3m,3n} + 2\times U_{3m,3(n+1)} + U_{3(m+1),3(n+1)}]$$

And the other interpolation values at the other coordinates are obtained in the same manner as described above.

Figure 12:
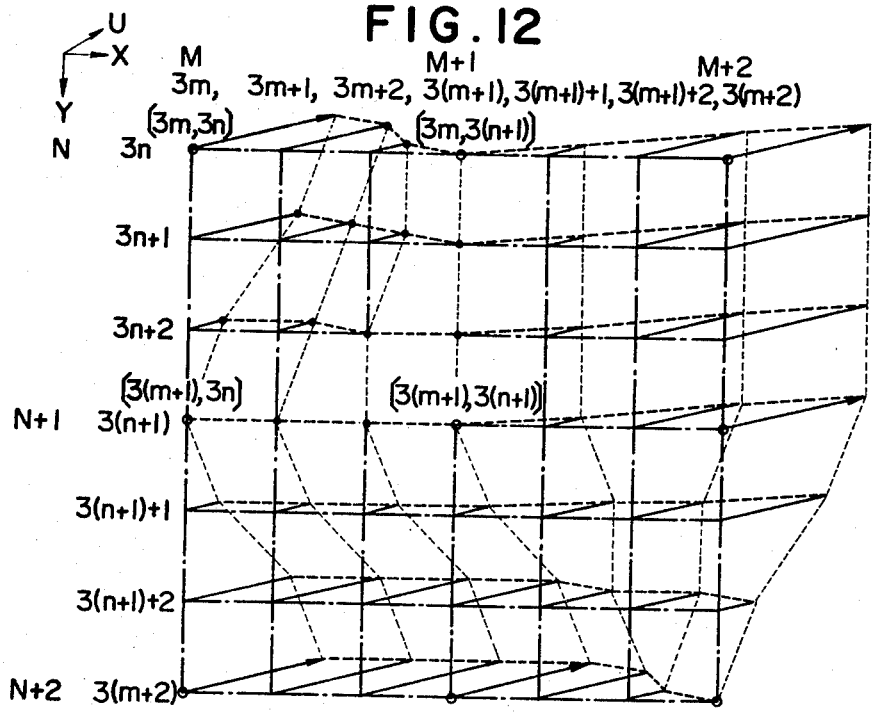
FIG. 12 is a schematic view in three dimensional coordinates of four adjacent interpolation units for interpolation of values, obtained according to an embodiment of the present invention, in which the sampling pitch is again three.

In FIG. 12 are shown the interpolated values for four adjacent interpolation units, which are obtained from the known values (shown by arrows) read out of the

TABLE 1

| | x | y | $U_{3m,3n}$ (1−x)(1−y) | $U_{3(m+1),3n}$ x(1−y) | $U_{3m,3(n+1)}$ (1−x)y | $U_{3(m+1),3(n+1)}$ xy |
|---|---|---|---|---|---|---|
| | | | (p = 3) | | | |
| 3m,3n | 0 | 0 | 9/9 | 0 | 0 | 0 |
| 3m + 1,3n | ⅓ | 0 | 6/9 | 3/9 | 0 | 0 |
| 3m + 2,3n | ⅔ | 0 | 3/9 | 6/9 | 0 | 0 |
| 3m,3n + 1 | 0 | ⅓ | 6/9 | 0 | 3/9 | 0 |
| 3m + 1,3n + 1 | ⅓ | ⅓ | 4/9 | 2/9 | 2/9 | 1/9 |
| 3m + 2,3n + 1 | ⅔ | ⅓ | 2/9 | 4/9 | 1/9 | 2/9 |
| 3m,3n + 2 | 0 | ⅔ | 3/9 | 0 | 6/9 | 0 |
| 3m + 1,3n + 2 | ⅓ | ⅔ | 2/9 | 1/9 | 4/9 | 2/9 |
| 3m + 2,3n + 2 | ⅔ | ⅔ | 1/9 | 2/9 | 2/9 | 4/9 |

TABLE 2

| | $U_{3m,3n}$ (1−x)(1−y) | $U_{3(m+1),3n}$ x(1−y) | $U_{3m,3(n+1)}$ (1−x)y | $U_{3(m+1),3(n+1)}$ xy |
|---|---|---|---|---|
| | (p = 3) | | | |
| 3m,3n | 4/4 | 0 | 0 | 0 |
| 3m + 1,3n | ¾ | ¼ | 0 | 0 |
| 3m + 2,3n | ¼ | ¾ | 0 | 0 |
| 3m,3n + 1 | ¾ | 0 | ¼ | 0 |
| 3m + 1,3n + 1 | 2/4 | ¼ | ¼ | 0 |
| 3m + 2,3n + 1 | ¼ | 2/4 | 0 | ¼ |
| 3m,3n + 2 | ¼ | 0 | ¾ | 0 |
| 3m + 1,3n + 2 | ¼ | 0 | 2/4 | ¼ |
| 3m + 2,3n + 2 | 0 | ¼ | ¼ | 2/4 | memory, according to the formula II, as described above.

Figure 13:
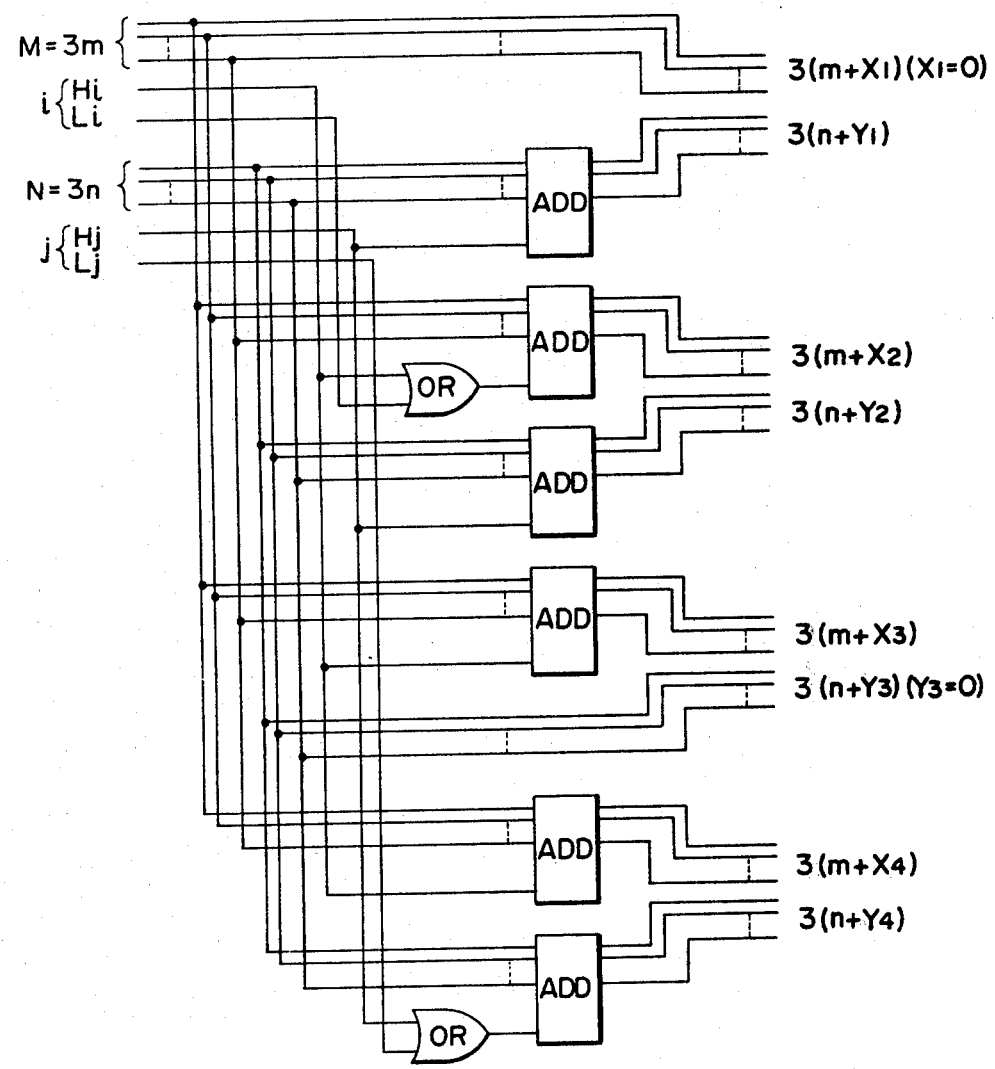
FIG. 13 is a schematic view of a digital circuit for obtaining read-out addresses of picture signals stored in the memory in order to obtain an interpolation value according to an embodiment of the present invention, in which the sampling pitch is again three.

In FIG. 13 is shown a digital circuit for obtaining read-out addresses of the color picture signals to be read out of the memory depending upon the digital values i and j as tabulated in Table 3, in order to obtain an interpolated values for the signals skipped according to formula (II), and this circuit comprises a combination of OR gates and adders, wherein M=3m and N=3n are the transverse and longitudinal address numbers of the color digital signals stored, and wherein $H_i$ and $H_j$ and $L_i$ and $L_j$ are the twos digits and units digits of the binary coded numbers i and j. For example, when i and j are 1 and 2, i.e. 01 and 10, $H_i$ is 0, $L_i$ is 1, $H_j$ is 1, and $L_j$ is 0.

Since, in Table 4, $X_3$ and $X_4$ are arranged to be the same values, and so are $Y_3$ and $Y_4$, a digital circuit for obtaining the read-out addresses of the color picture signals stored, depending on the values i and j in Table 4, can be more simple than the one in FIG. 13.

When the sampling pitch of the color picture signals is four, the interpolated values for the skipped signals can be obtained an analogous manner, to the case when the pitch is three.

TABLE 3

(p = 3)

| $X_1$ | | j | | | $Y_1$ | | j | |
|---|---|---|---|---|---|---|---|---|
| | | 00 | 01 | 10 | | 00 | 01 | 10 |
| | 00 | 0 | 0 | 0 | | 00 | 0 | 0 | 1 |
| i | 01 | 0 | 0 | 0 | i | 01 | 0 | 0 | 1 |
| | 10 | 0 | 0 | 0 | | 10 | 0 | 0 | 1 |

| $X_2$ | | j | | | $Y_2$ | | j | |
|---|---|---|---|---|---|---|---|---|
| | | 00 | 01 | 10 | | 00 | 01 | 10 |
| | 00 | 0 | 0 | 0 | | 00 | 0 | 0 | 1 |
| i | 01 | 1 | 1 | 1 | i | 01 | 0 | 0 | 1 |
| | 10 | 1 | 1 | 1 | | 10 | 0 | 0 | 1 |

| $X_3$ | | j | | | $Y_3$ | | j | |
|---|---|---|---|---|---|---|---|---|
| | | 00 | 01 | 10 | | 00 | 01 | 10 |
| | 00 | 0 | 0 | 0 | | 00 | 0 | 0 | 0 |
| i | 01 | 0 | 0 | 0 | i | 01 | 0 | 0 | 0 |
| | 10 | 1 | 1 | 1 | | 10 | 0 | 0 | 0 |

| $X_4$ | | j | | | $Y_4$ | | j | |
|---|---|---|---|---|---|---|---|---|
| | | 00 | 01 | 10 | | 00 | 01 | 10 |
| | 00 | 0 | 0 | 0 | | 00 | 0 | 1 | 1 |

TABLE 3-continued (p = 3)

| | | | | | | | | |
|---|---|---|---|---|---|---|---|---|
| i | 01 | 0 | 0 | 0 | i | 01 | 0 | 1 | 1 |
| | 10 | 1 | 1 | 1 | | 10 | 0 | 1 | 1 |

TABLE 4

(p = 3)

| $X_1$ | | j | | | $Y_1$ | | j | |
|---|---|---|---|---|---|---|---|---|
| | | 00 | 01 | 10 | | 00 | 01 | 10 |
| | 00 | 0 | 0 | 0 | | 00 | 0 | 0 | 1 |
| i | 01 | 1 | 1 | 1 | i | 01 | 0 | 0 | 1 |
| | 10 | 0 | 0 | 0 | | 10 | 0 | 0 | 1 |

| $X_2$ | | j | | | $Y_2$ | | j | |
|---|---|---|---|---|---|---|---|---|
| | | 00 | 01 | 10 | | 00 | 01 | 10 |
| | 00 | 0 | 0 | 0 | | 00 | 0 | 1 | 0 |
| i | 01 | 0 | 0 | 0 | i | 01 | 0 | 1 | 0 |
| | 10 | 1 | 1 | 1 | | 10 | 0 | 1 | 0 |

| $X_3$ | | j | | | $Y_3$ | | j | |
|---|---|---|---|---|---|---|---|---|
| | | 00 | 01 | 10 | | 00 | 01 | 10 |
| | 00 | 0 | 0 | 0 | | 00 | 0 | 0 | 1 |
| i | 01 | 0 | 0 | 0 | i | 01 | 0 | 0 | 1 |
| | 10 | 1 | 1 | 1 | | 10 | 0 | 0 | 1 |

| $X_4$ | | j | | | $Y_4$ | | j | |
|---|---|---|---|---|---|---|---|---|
| | | 00 | 01 | 10 | | 00 | 01 | 10 |
| | 00 | 0 | 0 | 0 | | 00 | 0 | 0 | 1 |
| i | 01 | 0 | 0 | 0 | i | 01 | 0 | 0 | 1 |
| | 10 | 1 | 1 | 1 | | 10 | 0 | 0 | 1 |

In this case, the square interpolation unit includes 16 points. The coefficients of the terms of the formula (I) for obtaining the interpolated values are calculated in the same manner as described above, thereby obtaining the results tabulated in Table 5, which is analogous to Table 1.

TABLE 5

| | (p = 4) | | | |
|---|---|---|---|---|
| | $U_{4m,4n}$ | $U_{4(m+1),4n}$ | $U_{4m,4(n+1)}$ | $U_{4(m+1),4(n+1)}$ |
| 4m,4n | 16/16 | 0 | 0 | 0 |
| 4m + 1,4n | 12/16 | 4/16 | 0 | 0 |
| 4m + 2,4n | 8/16 | 8/16 | 0 | 0 |
| 4m + 3,4n | 4/16 | 12/16 | 0 | 0 |
| 4m,4n + 1 | 12/16 | 0 | 4/16 | 0 |
| 4m + 1,4n + 1 | 9/16 | 3/16 | 3/16 | 1/16 |
| 4m + 2,4n + 1 | 6/16 | 6/16 | 2/16 | 2/16 |
| 4m + 3,4n + 1 | 3/16 | 9/16 | 1/16 | 3/16 |
| 4m,4n + 2 | 8/16 | 0 | 8/16 | 0 |
| 4m + 1,4n + 2 | 6/16 | 2/16 | 6/16 | 2/16 |
| 4m + 2,4n + 2 | 4/16 | 4/16 | 4/16 | 4/16 |
| 4m + 3,4n + 2 | 2/16 | 6/16 | 2/16 | 6/16 |
| 4m,4n + 3 | 4/16 | 0 | 12/16 | 0 |
| 4m + 1,4n + 3 | 3/16 | 1/16 | 9/16 | 3/16 |
| 4m + 2,4n + 3 | 2/16 | 2/16 | 6/16 | 6/16 |
| 4m + 3,4n + 3 | 1/16 | 3/16 | 3/16 | 9/16 |

Figure 14:
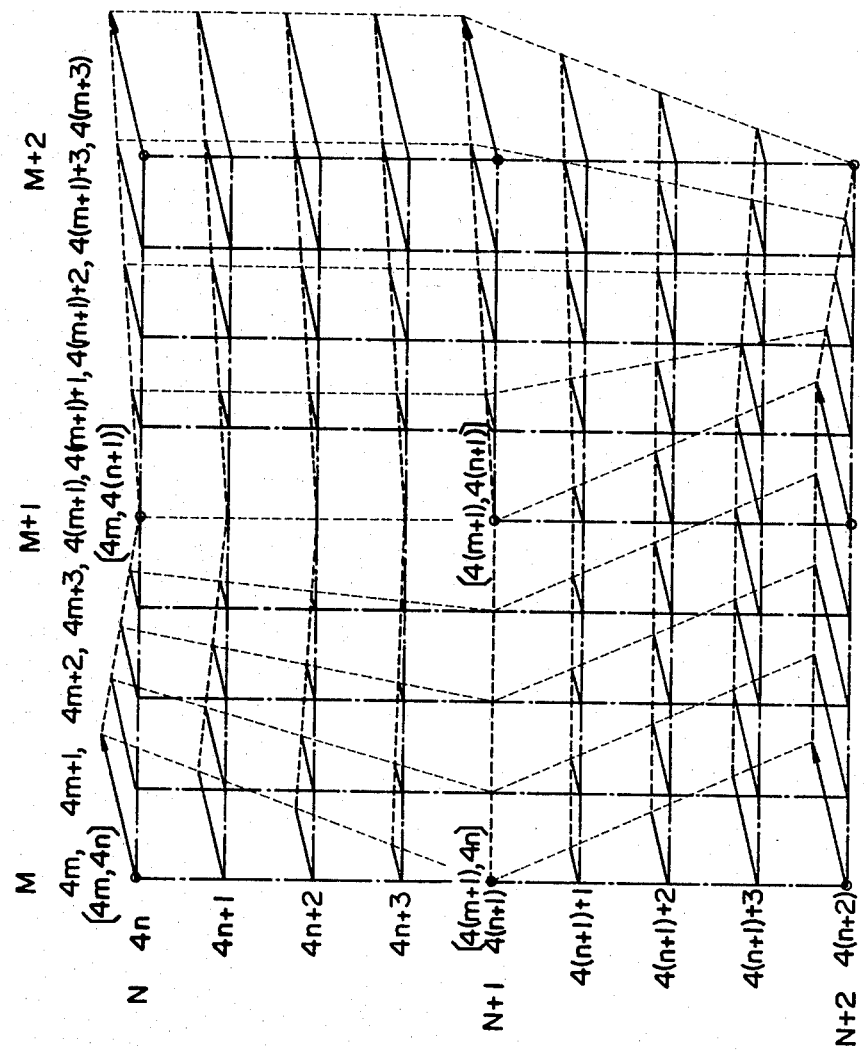
FIGS. 14, 15, and 16 are figures corresponding to FIGS. 11, 12, and 13, except that the sampling pitch is here four; that is.

In FIG. 14 are shown the interpolated values for an example of four interpolation units, as obtained according to the formula (I), which is the conventional interpolation method using the coefficients in Table 5. It is clear that the interpolated values are linear and smooth and continuous between the boundaries of the interpolation units.

The coefficients in Table 5 may be simplified in the same manner as described above, resulting in the simplified weghting coefficients tabulated in Table 6.

TABLE 6

(p = 4)

|  | $U_{4m,4n}$ | $U_{4(m+1),4n}$ | $U_{4m,4(n+1)}$ | $U_{4(m+1),4(n+1)}$ |
|---|---|---|---|---|
| 4m,4n | 4/4 | 0 | 0 | 0 |
| 4m + 1,4n | 3/4 | 1/4 | 0 | 0 |
| 4m + 2,4n | 2/4 | 2/4 | 0 | 0 |
| 4m + 3,4n | 1/4 | 3/4 | 0 | 0 |
| 4m,4n + 1 | 3/4 | 0 | 1/4 | 0 |
| 4m + 1,4n + 1 | 2/4 | 1/4 | 1/4 | 0 |
| 4m + 2,4n + 1 | 2/4 | 1/4 | 0 | 1/4 |
| 4m + 3,4n + 1 | 1/4 | 2/4 | 0 | 1/4 |
| 4m,4n + 2 | 2/4 | 0 | 2/4 | 0 |
| 4m + 1,4n + 2 | 1/4 | 1/4 | 2/4 | 0 |
| 4m + 2,4n + 2 | 1/4 | 1/4 | 1/4 | 1/4 |
| 4m + 3,4n + 2 | 0 | 2/4 | 1/4 | 1/4 |
| 4m,4n + 3 | 1/4 | 0 | 3/4 | 0 |
| 4m + 1,4n + 3 | 1/4 | 0 | 2/4 | 1/4 |
| 4m + 2,4n + 3 | 1/4 | 0 | 1/4 | 2/4 |
| 4m + 3,4n + 3 | 0 | 1/4 | 1/4 | 2/4 |

Thus, the interpolated values are obtained in the same manner as described above, according to the formula (II), by using $X_{1-4}$ and $Y_{1-4}$, determined according to the combination of i and j, one example of which is tabulated in Table 7, in the same way as in Table 3 or 4.

Figure 15:
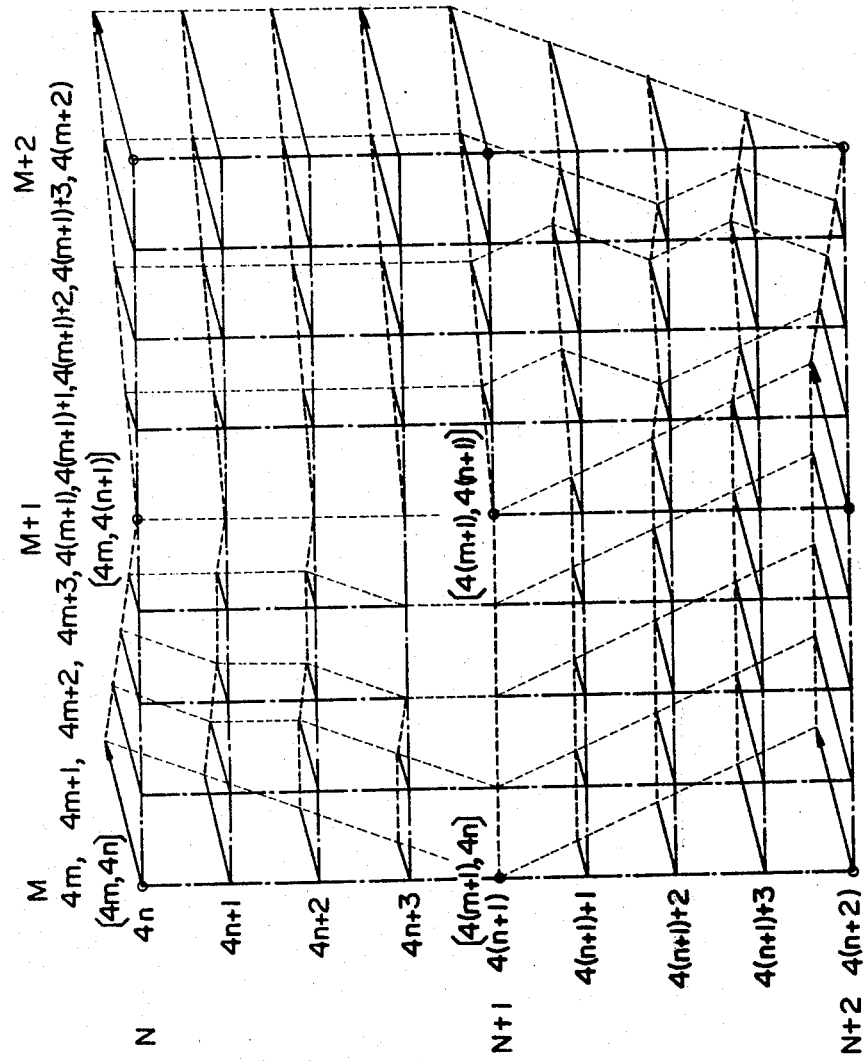

In FIG. 15 are shown the interpolated values for four adjacent interpolation units, which are obtained from the known values (shown by arrows) read out of the memory, according to the formula (II), as described above.

TABLE 7

(p = 4)

| $X_1$ | j=00 | 01 | 10 | 11 | $Y_1$ | j=00 | 01 | 10 | 11 | $X_3$ | j=00 | 01 | 10 | 11 | $Y_3$ | j=00 | 01 | 10 | 11 |
|---|---|---|---|---|---|---|---|---|---|---|---|---|---|---|---|---|---|---|---|
| i=00 | 0 | 0 | 0 | 10 | 00 | 0 | 0 | 1 | 1 | 00 | 0 | 0 | 0 | 0 | 00 | 0 | 1 | 1 | 1 |
| i=01 | 0 | 0 | 0 | 0 | i=01 | 0 | 0 | 1 | 1 | i=01 | 0 | 0 | 0 | 0 | i=01 | 0 | 1 | 1 | 1 |
| 10 | 0 | 0 | 0 | 0 | 10 | 0 | 0 | 1 | 1 | 10 | 1 | 1 | 1 | 1 | 10 | 0 | 1 | 1 | 1 |
| 11 | 0 | 0 | 0 | 0 | 11 | 0 | 0 | 1 | 1 | 11 | 1 | 1 | 1 | 1 | 11 | 0 | 1 | 1 | 1 |

| $X_2$ | j=00 | 01 | 10 | 11 | $Y_2$ | j=00 | 01 | 10 | 11 | $X_4$ | j=00 | 01 | 10 | 11 | $Y_4$ | j=00 | 01 | 10 | 11 |
|---|---|---|---|---|---|---|---|---|---|---|---|---|---|---|---|---|---|---|---|
| i=00 | 0 | 0 | 0 | 0 | 00 | 0 | 0 | 0 | 0 | 00 | 0 | 0 | 0 | 0 | 00 | 0 | 0 | 0 | 1 |
| i=01 | 0 | 0 | 0 | 0 | i=01 | 0 | 0 | 0 | 0 | i=01 | 1 | 1 | 1 | 1 | i=01 | 0 | 0 | 0 | 1 |
| 10 | 0 | 0 | 0 | 0 | 10 | 0 | 0 | 0 | 0 | 10 | 1 | 1 | 1 | 1 | 10 | 0 | 0 | 0 | 1 |
| 11 | 1 | 1 | 1 | 1 | 11 | 0 | 0 | 0 | 0 | 11 | 1 | 1 | 1 | 1 | 11 | 0 | 0 | 0 | 1 |

Figure 16:
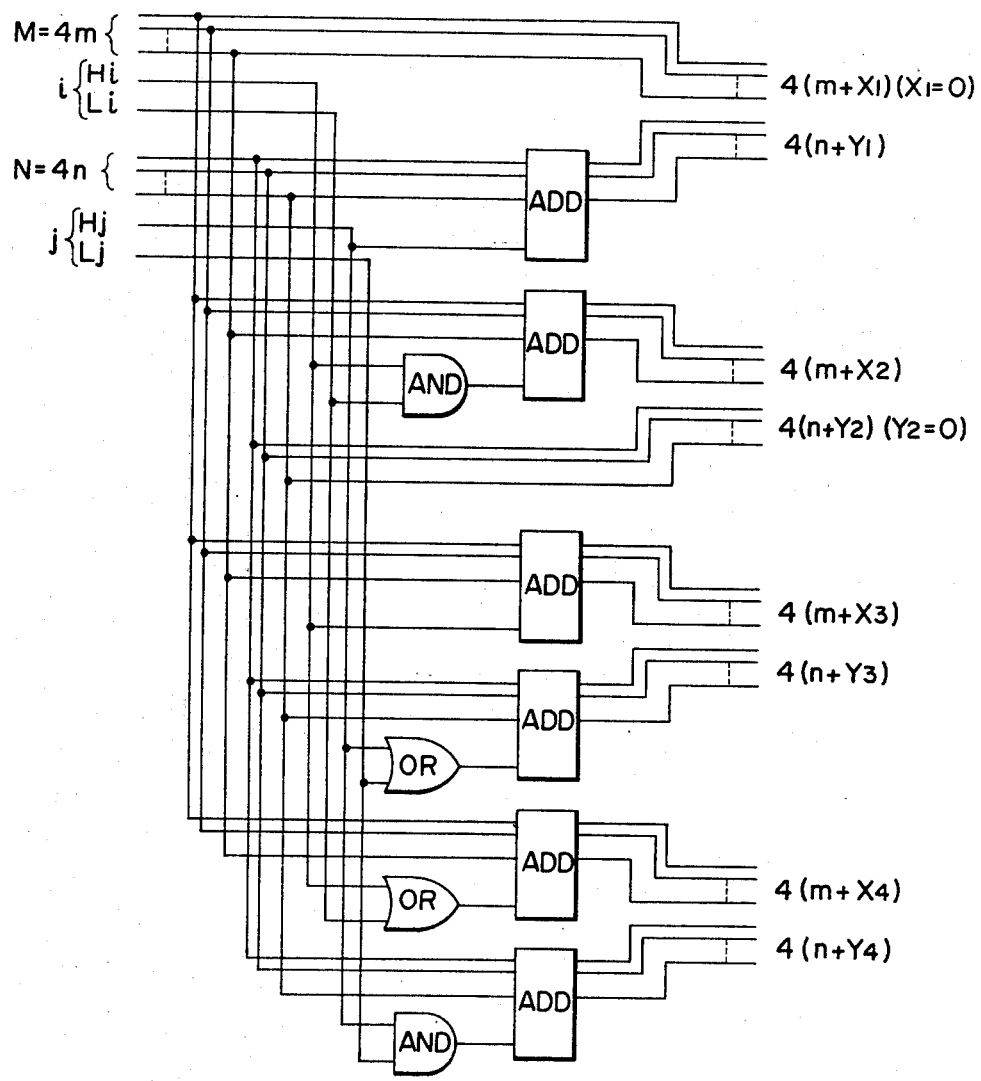

In FIG. 16 is shown a digital circuit for obtaining read-out addresses of the color picture signals to be read out of the memory, depending on the digital values i and j tabulated in Table 7, in order to obtain the interpolated values of the picture signals according to the formula (II), which comprises a combination of AND gates, OR gates, and adders, wherein M=4m and N=4n are the transverse and the longitudinal address numbers of the color digital signals stored in the memory, in a similar manner to that of FIG. 13.

When the sampling pitch of the color picture signals is two, the skipped signals may be reproduced by repeating the adjacent signals stored in the memory, instead of interpolating according to the method of the present invention.

It is possible, according to the present invention, to store the color separation signals of the additive primaries in the memory. In this case, red, green, and blue density signals DR, DG, and DB as shown in FIG. 2 are converted into digital signals. All the green digital signals are stored, and the red and the blue digital signals are skipped in the manner detailed above. Interpolation is then performed, as above.

Although the present invention has been shown and described with reference to several preferred embodiments thereof, it should be understood that various changes and modifications to the form of any particular embodiment may be made therein by one skilled in the art, without departing from the scope of the invention. Therefore it is desired that this scope should be determined solely by the accompanying claims.

I claim:

1. A method of reproducing a picture, which comprises:
   (a) scanning a color original picture;
   (b) generating an analog original picture signal;
   (c) separating said analog picture signal into a plurality of n analog separation original picture signals;
   (d) converting each of said n signals into a stream of digital separation original picture signals;
   (e) storing all of one of said digital separation original picture signal streams in a memory;
   (f) sampling each of the n−1 other digital separation original picture signal streams according to a regular pattern;
   (g) storing said sampled n−1 signals in said memory;
   (h) producing digital separation reproduction picture signal streams corresponding to said digital separation original picture signal streams;
   (i) said producing comprising, in the case of the said one digital separation original picture signal stream, reading out said stored digital signal from said memory;
   (j) said producing comprising, in the case of each of said n−1 other digital separation original picture signal streams, reading out said stored sampled digital separation original picture signals corresponding thereto from said memory;

(k) interpolating intermediate values between said stored sampled digital separation original picture signals;

(l) converting said digital separation reproduction picture signal streams to analog form; and (m) using said converted signals to produce a reproduction picture.

2. Method in accordance with claim 1, wherein said one digital separation original picture signal stream corresponds to gray values of said original picture.

3. Method in accordance with claim 1, wherein said n−1 other digital separation original picture signal streams correspond to color separations of said original picture.

4. Method in accordance with claim 1, wherein said one digital separation original picture signal stream corresponds to a green color separation of said original picture.

5. Method in accordance with claim 1, wherein said other digital separation original picture signal streams are two in number:

(a) one said stream corresponding to red separation of said original picture;

(b) the other said stream corresponding to blue separation of said original picture.

6. Method in accordance with claims 1, 2, 3, 4 or 5, wherein the detail of said one digital separation original picture signal stream is contrasted prior to storage in said memory.

7. Method in accordance with claims 1, 2, 3, 4 or 5, wherein said scanning is performed in a rectangular raster pattern, and wherein said pattern of sampling each of said n−1 other digital separation original picture signal streams selects from each p-th raster line, each q-th value, where p and q are fixed integers relating to each said stream.

8. Method in accordance with claim 7, wherein, in each said stream, said p and q are equal.

9. Method in accordance with claim 8 wherein the values of p and q for all streams are the same.

10. Method in accordance with claim 7 wherein interpolated values of each of said sampled digital separation reproduction picture signal streams are obtained from four stored values in said memory at the vertices of a unit rectangle, in the raster memory map, by interpolation.

11. Method in accordance with claim 10, wherein p and q are both equal to three, for all the digital separation original picture signal streams, and wherein the weighting coefficients for interpolation are as specified in Table 2 of the attached specification.

12. Method in accordance with claim 10, wherein said p and q are equal to four, in all said digital separation original picture signal streams, and wherein the weighting coefficients for interpolation are as specified in Table 6 of the attached specification.

13. Method according to claim 1, 2, 3, 4 or 5, wherein said memory comprises n separate memory units, wherein said one digital separation original picture signal stream is stored in one of said n units, said sample values of one of said other digital separation original picture signal streams are stored in each of the remaining units of said memory.

14. Method in accordance with claims 1, 2, 3, 4 or 5, wherein said memory comprises two separate memory units, wherein in one of said two units is stored said one digital separation original picture signal stream, and wherein in the other of said two units is stored all said sampled values of all said other digital separation original picture signal streams.

15. Apparatus for reproducing a color picture comprising:

(a) pickup means for scanning a color original picture;

(b) means for generating an analog original picture signal;

(c) means for separating said analog original picture signal into n analog separation original picture signals;

(d) means for converting each of said n analog separation original picture signals into a stream of digital separation original picture signals;

(e) signal skipping means for sampling n−1 of n streams of digital separation original picture signals, each according to a regular pattern;

(f) memory means for storing sampled values of said n−1 digital separation original picture signal streams, and for storing in its entirety the other digital separation original picture signal streams;

(g) means for addressing to read out stored values from said memory, providing memory output signal streams corresponding to the n digital separation original picture signal streams;

(h) means for signal interpolation of values into n−1 memory output signal streams corresponding to n−1 digital separation original picture signal streams which were sampled and which does not alter the other memory output signal stream, and which outputs these streams as digital separation reproduction picture signal streams;

(i) means for digital-analog conversion which converts said digital separation reproduction picture signal streams into analog separation reproduction picture signal streams; and (j) means for recording which receives said analog separation reproduction picture signal streams and records a reproduction picture therefrom.

16. Apparatus in accordance with claim 15, wherein said addressing means comprises means for layout control and means for address operation, said means for address operation outputting a reading address signal, and wherein said means for layout control controls the means for address operation for changing the readout orders of the digital reproduction signals by the reading address signal.

* * * * *

UNITED STATES PATENT AND TRADEMARK OFFICE
CERTIFICATE OF CORRECTION

PATENT NO. : 4,270,141

DATED : May 26, 1981

INVENTOR(S) : TAKASHI SAKAMOTO

It is certified that error appears in the above-identified patent and that said Letters Patent is hereby corrected as shown below:

Column 4, line 26, before "pivot" insert -- a --.

Column 10, line 51, first line of formula after "(1-y)" omit -- - --.

Column 15, table 7, section x, first line directly under "11", omit "10" and insert --0--.

*Signed and Sealed this*

*Twenty-ninth* Day of *October 1985*

[SEAL]

*Attest:*

DONALD J. QUIGG

*Attesting Officer*

*Commissioner of Patents and Trademarks—Designate*

UNITED STATES PATENT AND TRADEMARK OFFICE
CERTIFICATE OF CORRECTION

PATENT NO. : 4,270,141
DATED : May 26, 1981
INVENTOR(S) : TAKASHI SAKAMOTO

It is certified that error appears in the above-identified patent and that said Letters Patent is hereby corrected as shown below:

Column 4, line 26, before "pivot" insert -- a --.

Column 10, line 51, first line of formula after "(1-y)" omit -- - --.

Column 12, lines 6-9, omit entire formula and insert $$U_{3m+i,3n+j} = 1/4 \; [ \; U_{3(m+X_1),3(n+Y_1)} + U_{3(m+X_2),3(n+Y_2)}$$

$$\ldots\ldots(II) \qquad + U_{3(m+X_3),3(n+Y_3)} + U_{3(m+X_4),3(n+Y_4)} \; ]$$

Column 15, table 7, section x, first line directly under "11", omit "10" and insert -- 0 --.

*Signed and Sealed this*

*Twenty-fourth* Day of *December 1985*

[SEAL]

*Attest:*

DONALD J. QUIGG

*Attesting Officer*     *Commissioner of Patents and Trademarks*